United States Patent [19]

Staritzbichler et al.

[11] Patent Number: 4,871,807
[45] Date of Patent: Oct. 3, 1989

[54] WATER-DILUTABLE PAINT BINDERS HAVING IMPROVED CORROSION RESISTANCE

[75] Inventors: Werner Staritzbichler; Gert Dworak; Wolfgang Daimer, all of Graz, Austria

[73] Assignee: Vianova Kunstharz, A.G., Werndorf, Austria

[21] Appl. No.: 136,981

[22] Filed: Dec. 23, 1987

[30] Foreign Application Priority Data

Dec. 23, 1986 [AT] Austria .................................. 3413/86

[51] Int. Cl.⁴ ...................... C08L 33/08; C08L 33/10; C08L 63/02; C08L 75/08
[52] U.S. Cl. .................................... 525/113; 525/108; 525/111; 525/117; 525/119; 523/404; 523/410; 523/412; 523/415; 523/417
[58] Field of Search ............... 525/128, 113, 117, 119; 523/410, 415, 412

[56] References Cited

U.S. PATENT DOCUMENTS

| | | | |
|---|---|---|---|
| 4,069,183 | 1/1978 | Daimer | 524/513 |
| 4,174,332 | 11/1979 | Hönig et al. | 524/523 |
| 4,423,169 | 12/1983 | Valko | 523/410 |
| 4,619,952 | 10/1986 | Hart et al. | 523/410 |
| 4,686,249 | 11/1987 | Diefenbach et al. | 523/410 |
| 4,711,934 | 12/1987 | Paar et al. | 525/481 |

*Primary Examiner*—John C. Bleutge
*Assistant Examiner*—Robert E. Lee Sellers II
*Attorney, Agent, or Firm*—A. W. Breiner

[57] ABSTRACT

Water-dilutable paint binders for the formulation of ecological stoving paints containing only minor quantities of organic solvents are described. The binders are partial condensation products of (A) a polycondensation, polymerization, or polyaddition resin as the film-forming polycarboxy compound (PC-component), and (B) an epoxy resin amine adduct (PH-component) carrying hydroxy groups and being water-insoluble under normal processing conditions. The products afford improved corrosion resistance and are particularly suited for the formulation of primers, intercoats (primer surfacers), and single coat paints.

6 Claims, No Drawings

WATER-DILUTABLE PAINT BINDERS HAVING IMPROVED CORROSION RESISTANCE

FIELD OF INVENTION

The present invention is directed to water-dilutable paint binders for the formulation of ecological stoving paints containing only minor quantities of organic solvents, and to a process of producing the binders. More particularly, the binders are partial condensation products of (A) a film-forming polycarboxy compound (PC-component), water-soluble upon neutralization; and (B) an epoxy resin amine adduct (PH-component) carrying hydroxy groups and being water-insoluble under normal processing conditions. The binders, in paint compositions, provide excellent corrosion resistance.

BACKGROUND OF INVENTION

U.S. Pat. No. 3,960,789, Canadian Patent No. 1,032,679, and Japanese Patent No. 1,209,243 disclose paint binders comprising film-forming polycarboxy compounds, water-soluble upon neutralization, and water-insoluble polyhydroxy compounds based on polyesters, polyurethanes, or copolymers. These paint binders, as a principal feature, do not show the anomal behavior on dilution with water as do similar resins which are rendered water-dilutable on salt formation.

U.S. Pat. No. 4,431,780 and Canadian Patent No. 1,182,232 disclose a modification of the paint binders of U.S. Pat. No. 3,960,789 through a specific selection of the essential characteristics of the PC-component and PH-components. The binders thus obtained can be used for the formulation of air-drying paints.

The aforesaid paint binders can be formulated into paints for conventional applications despite the low content of auxiliary organic solvents in the paints. The films obtained afford excellent decorative properties. However, the corrosion protection of stoving primers and a single coat of the paints do not satisfy the rising exigencies of certain applications, such as in painting automobile bodies, particularly if the paint formulation does not include additional anticorrosive pigments.

GENERAL DESCRIPTION OF INVENTION

It has now been found that the corrosion protection of stoving primers and single coat paints can be improved if the PC- and PH-components are judiciously selected. According to the invention, PC-components are combined through partial condensation with PH-components based on epoxy resin amine adducts.

Thus, the present invention is concerned with the production of low organic solvent containing binders for stoving coating compositions, water-dilutable upon partial or total salt formation with ammonia or amines, based on a combination of a film-forming water-dilutable polycarboxy compound (PC-component) with a film-forming water-insoluble polyhydroxy compound (PH-component), characterized in that -

(A) 10 to 90% by weight, preferably 20 to 50% by weight of (Aa) one or more addition products of maleic acid (anhydride) with unsaturated oils and/or fatty acids, the anhydride groups being opened with water and/or a monoalcohol and which have an acid value of between 50 and 400 mg KOH/g and an intrinsic viscosity of from 4.5 to 8.0 ml/g (measured in N,N-dimethylformamide (DMF) at 20° C.), and/or (Ab) one or more copolymers with an acid value of between 100 and 200 mg KOH/g, and an intrinsic viscosity of between 4.5 and 8 ml/g (measured in DMF/20° C.), are condensed at from 80° to 140° C. to an intrinsic viscosity of from 14 to 19 ml/g (measured in DMF/20° C.) with -

(B) 90 to 10% by weight, preferably 50 to 80% by weight, of an epoxy resin amine adduct, substantially insoluble in water under processing conditions, having a hydroxyl value of between 50 and 300 mg KOH/g and an intrinsic viscosity of from 9 to 12 ml/g, preferably between 10 and 11 ml/g (measured in DMF/20° C.).

Surprisingly, through the use of the select component (B), which is cationic, the resistance to corrosion, saponification, and chemicals is essentially improved, particularly on untreated steel.

The invention is further concerned with the use of paint binders produced according to the invention, in combination with conventional crosslinking components, such as phenolic resins, melamine resins, urea resins, benzoguanamine resins, or glycoluril resins in the formulation of water-dilutable paints.

The film-forming polycarboxy compounds (component (A) above) are macromolecular emulsifiers which, upon crosslinking of the coatings, contribute to film formation as integrated constituents. Suitable starting materials for polycarboxy component (A) according to the present invention are resins such as are used as the polycarboxy component in U.S. Pat. No. 3,960,789. However, in order to achieve the above-mentioned improved results according to this invention, component (A) must have an intrinsic viscosity, measured in DMF at 20° C., of between 4.5 and 9.0 ml/g. Particularly suited for the present invention are the addition products of maleic anhydride with drying oils, or the fatty acids of such oils and hydroxy-free esters of such fatty acids with other polyalcohols. Addition products of maleic anhydride to liquid polydienes, such as the low-molecular butadiene polymers or isoprene polymers as well as the corresponding mixed polymers, are also suitable in the formation of component (A). Prior to use of the adducts according to the present invention, the anhydride groups are split with water, monoalcohols, or glycolmonoethers. Furthermore, copolymers which have a sufficient quantity of (meth)acrylic acid or maleic acid to provide an acid value of between 100 and 200 mg KOH/g, necessary for attaining water solubility, are also suitable as the PC-component. The co-monomers of such polymers are the conventionally used (meth)acrylates such as methyl methacrylate, butyl methacrylate, butyl acrylate, hydroxyethyl methacrylate, ethyl methacrylate, hyroxypropyl methacrylate, and the like; and other vinyl aromatic compounds known to one skilled in the art.

The preparation of the maleic acid adducts and of the copolymers is carried out in a manner known to one skilled in the art. This also applies to the splitting of the anhydride configuration of the adducts.

The polyhydroxy components according to the present invention are reaction products of epoxy compounds with secondary or primary amines, i.e., the so-called epoxyamine-adducts. Starting materials for such products are the commercially available diepoxy resins having an epoxy equivalent weight of from about 190 to 2000, based on dialcohols or diphenols. Particularly suited are the diepoxy resins based on bisphenol A and epichlorohydrin. Another group of suitable epoxy resins are the commercially available novolak-epoxy resins. Monoepoxy compounds such as glycidyl ethers, glycidyl esters, or olefin oxides may also optionally be used in mixture with the higher functional epoxy resins. Prior to the reaction with the amine, the diepoxy resins may be modified in a variety of ways, for instance the chains can be prolonged through reaction with diols, diphenols, dicarboxylic acids, lactane diols, diamines, or primary monoamines.

The preferred amines are secondary alkanolamines, alone or together with secondary alkylamines. Particularly preferred amines are the dialkanolamines.

In order to attain the necessary intrinsic viscosity of the epoxy-amine-adducts, either epoxy resins with a higher molecular weight are used or the molecular weight is raised through reaction of the epoxy-amine-adducts with a polyisocyanate. Polyisocyanate as used herein, as is conventional, includes the diisocyanates. The products used as polyhydroxy component (B), above, according to the invention must have an intrinsic viscosity of from about 9 to 12 ml/g, measured in DMF/20° C. They also must have a hydroxyl value of 50 to 300 mg KOH/g which may stem from the hydroxyl groups resulting from the amine addition reaction, the hydroxy groups of the alkanolamine and, optionally, from the compounds used to prolong the chains.

The preferred epoxy-amine-adducts are adducts of diepoxy resins and dialkanolamines, the desired molecular weight, expressed by the intrinsic viscosity, being adjusted by judicious reaction with a diisocyanate such as toluylenediisocyanate, isophoronediisocyanate, hexamethylenediisocyanate, or a diisocyanate prepolymer, such as a 3:1 adduct of trimethylolpropane and toluylenediisocyanate.

It is also possible to modify the PH-component by reaction of the epoxy-amine-adducts with a polyisocyanate, such as a diisocyanate, in the presence of further hydroxy group containing polycondensation products or polyaddition products. The modifying components may be modified or unmodified polyesters, acrylic copolymers, or other epoxy-amineadducts, the intrinsic viscosity of which is below about 8 ml/g (DMF/20° C.). In this way the intrinsic viscosity of the epoxy-amine-adduct as well as the properties of the final product can be controlled.

Components (A) and (B) are partially condensed at from about 80 to 140° C. until an intrinsic viscosity of 14 to 19 ml/g, measured in DMF/20° C., is attained. It is only necessary that care be taken so that on condensation the soluble state is not transgressed. In order that the soluble state is not transgressed, components (A) and (B) should have intrinsic viscosities whereby the quotient of IV(B) : IV(A) lies between 1.4 and 2.7 (IV-=intrinsic viscosity).

The preparation of the epoxy-amine-adducts as well as the partial condensation reaction is best carried out in the presence of organic solvents, preferably water-tolerant solvents such as glycolmonoethers or glycoldiethers, or ketones.

The binders, after at least partial neutralization of the carboxy groups with a base such as ammonia or alkali hydroxides or, preferably, organic amines, are practically infinitely dilutable with water. Clear or opaque solutions result with excellent storage stability in the normal range of concentrations.

The binders of the invention can be used to formulate anticorrosive primers or single coat paints. A special application of the products of the invention are for intermediate coats of the type used in the automobile industry as primer surfacers. "Primer surfacer" as the term is used herein, is a coating applied to a primer which is optionally applied by electrodeposition. A primer surfacer serves as an intercoat to a finishing enamel and permits the repair of defects of the primer coating and forms a base for the finish coating. Such a paint system is primarily used in the automobile industry in the painting of car bodies. It is evident that the intercoat has to show a balance of properties regarding adhesion, hardness, sanding properties, flexibility, and the like. The products of this invention have the aforesaid balance and also good corrosion resistance.

The formulation of the paints for the various fields of use, their preparation, and processing are those conventionally used and are known to one skilled in the art from the open literature.

The following examples illustrate the invention without limiting its scope. Parts and percentages are by weight unless otherwise stated.

EXAMPLE 1

Component (A1)

In a suitable reaction vessel a blend of 165 parts dehydrated castor oil (DCO) and 135 parts linseed oil is transesterified at 250° C. for one hour. After cooling to 170° C., 100 parts maleic anhydride are added and reacted at 210° C. until no free maleic anhydride can be traced. The adduct is cooled to 90° C., and after addition of a blend of 30 parts water and 3 parts triethylamine, the adduct is hydrolyzed until an acid value of about 200 mg KOH/g is attained. The batch is diluted with methoxypropanol to a solids content of 80%.

Component (B1)

475 parts of a bisphenol A/epichlorohydrin epoxy resin (epoxy equivalent weight about 475) are dissolved in 100 parts diethyleneglycoldimethylether (DGM). At 80° C. a blend of 105 parts diethanolamine and 45 parts DGM is added, and the batch is reacted to substantial completion. Methylethylketone is added to give a solids content of 65% and through addition of about 40 parts toluylenediisocyanate in portions, the intrinsic viscosity is raised to about 10 ml/g (measured in DMF/20° C.). The solvent is then vacuum-stripped to a solids content of 80%.

Combination According To The Invention (C1)

25 parts of component (A1) and 100 parts of component (B1) are mixed. The partial condensation reaction is carried out at 100° C. until an intrinsic viscosity of 16 ml/g (measured in DMF/20° C.) is attained. The acid value of the condensate is about 42 mg KOH/g. After cooling, the batch is neutralized with 6 parts dimethylethanolamine and diluted with deionized water to a solids content of 35%.

EXAMPLE 2

Component (B2/1) - First Reaction Step

In a suitable reaction vessel, 150 parts triethyleneglycol, 134 parts trimethylolpropane, and 148 parts phthalic acid anhydride are heated to 220° C. and esterified at such temperature until an acid value of about 3 mg KOH/g is attained. The viscosity, DIN 53 211/20° C. (70% in butylglycol) lies between 75 and 125 seconds.

Component (B2/2) - Second Reaction Step

At 80° C., to a mixture of 105 parts diethanolamine, 116 parts component (B2/1) and 74 parts diglycoldimethylether, 594 parts of a solution consisting of 475 parts of a bisphenol A/epichlorohydrin epoxy resin (epoxy equivalent weight about 475) and 119 parts diglycoldimethylether are added in portions and reacted until practically all oxirane groups have been consumed. Then 75 parts Cardura E are added and the temperature is raised to 160° C. and held until no free epoxy groups can be traced.

At 70° C., the solids content is adjusted to 66% with methylethylketone and the intrinsic viscosity (measured in DMF/20° C.) is raised to about 10.3 ml/g through addition in portions of about 45 parts toluylenediisocyanate. Then the solvent is vacuum-stripped to a solids content of 80%.

Combination According To The Invention (C2)

25 parts of component (A1) and 100 parts of component (B2/2) are mixed. The partial condensation reaction is carried out at about 105° C. until an intrinsic viscosity (measured in DMF/20° C.) of about 17 ml/g is attained.

The acid value of the condensate is about 40 mg KOH/g. After cooling to 90° C., the batch is neutralized with 6 parts dimethylethanolamine and diluted with deionized water to a solids content of 35%.

EXAMPLE 3

Component (A3)

To a suitable reaction vessel 100 parts is isopropanol are charged, heated to reflux temperature, and, within four hours, a blend of 25 parts acrylic acid, 37.5 parts methylmethacrylate, 37.5 parts n-butylacrylate, 0.5 parts tert.dodecylmercaptan, and 3 parts azobisisobutyronitrile are added. Then the temperature is held until the conversion is complete. The acid value is 190 mg KOH/g, the intrinsic viscosity (measured in DMF/20° C.) about 9 ml/g, and the solids content 50%.

Combination According To The Invention (C3)

80 parts of component (A3), 75 parts of component (B1), and 17 parts diglycoldimethylether are mixed. The partial condensation reaction is carried out at 120°-125° C. (during heating, 40 parts isopropanol distilled from component (A3)), until an intrinsic viscosity (measured in DMF/20° C.) of about 19 ml/g is attained. After cooling to 90° C., the batch is neutralized with 9 parts dimethylethanolamine and diluted with deionized water to a solids content of 30%.

Pigmented Paint (D1) to (D3)

In known manner, pigment pastes are prepared on a pearl mill using materials as follows:

|  | (D1) | (D2) | (D3) |
|---|---|---|---|
| Combination (C1)/35% | 123 | — | — |
| Combination (C2)/35% | — | 123 | — |
| Combination (C3)/30% | — | — | 143 |
| Deionized Water | 25 | 25 | 52 |
| Titanium Dioxide (Rutile) | 80 | 80 | 80 |
| Barium Sulfate | 40 | 40 | 40 |
| Carbon Black | 0.2 | 0.2 | 0.2 |
| Paste | 268.2 | 268.2 | 315.2 |
| Combination (C1)/35% | 193 | — | — |
| Combination (C2)/35% | — | 193 | — |
| Combination (C3)/30% | — | — | 226 |
| Hexamethoxymethylmelamine/100% | 12 | 12 | 12 |
| Paint | 473.2 | 473.2 | 553.2 |
| Solids Content, Calc | 51.3% | 51.3% | 43.9 |
| pH-Value | about 9.0 | about 9.0 | about 9.0 |
| Efflux Time (seconds) DIN 53 211/20° C. | about 30 | about 30 | about 30 |

Pigmented Comparison Paint (D4)

A pigment paste is prepared from 134 parts of a binder, 75%, according to Example 1 of U.S. Pat. No. 3,960,789 (component (A): DCO-linseed oil adduct; component (B): polyester of triethyleneglycol, phthalic acid anhydride and trimethylolpropane; condensed at 120° C. for one hour), 88 parts ethyleneglycolmonobutylether, 167 parts titanium dioxide (Rutile type), 84 parts barium sulfate, and 0.5 parts carbon black. The paste is formulated into a paint with 158 parts resin, 75%, 33 parts hexamethoxymethylmelamine (100%), 41 parts ethyleneglycolmonobutylether, and 209 parts deionized water. The paint has a solids content of about 55%, a pH-value of about 8, and an efflux time, DIN 53 211/20° C., of about 30 seconds.

Results Of Paint Evaluation

The paints are spray applied to untreated steel and stoved at 120° C., 140° C., and 160° C. The films have a dry film thickness of 25 to 30 μm. The results are listed in the Table 1:

TABLE 1

|  | Paint (D1) | | | Paint (D2) | | | Paint (D3) | | | Paint (D4) (Comparison Example) | | |
|---|---|---|---|---|---|---|---|---|---|---|---|---|
| Stoving Conditions 20 Minutes at | 120° C. | 140° C. | 160° C. | 120° C. | 140° C. | 160° C. | 120° C. | 140° C. | 160° C. | 120° C. | 140° C. | 160° C. |
| Konig Pendulum Hardness (Seconds) | 140 | 160 | 160 | 140 | 180 | 180 | 150 | 170 | 170 | 80 | 150 | 160 |
| Erichsen Indenation (mm) | 4–5 | 4 | 4 | 5 | 6 | 6 | 2–3 | 3 | 3 | 8 | 3 | 2 |
| Salt Spray, ASTM B 117/64, 240 Hours Peel-Off at Cross-Incision (mm) | 3–8 | 3–5 | 2–3 | 4–7 | 3–5 | 2–3 | 7–10 | 5–8 | 5–8 | Total | 30–40 | 30–50 |
| Tropics Test (Humidity Chamber) 240 Hour/40° C. Evaluation DIN 50 017 | m0 g0 | m0 g0 | m0 g0 | m0 g0 | m0 g0 | m0 g0 | m0 g0 | m0 g0 | m0 g0 | m5 g5 | m4 g2 | m2 g2 |

As will be apparent to one skilled in the art, various modifications can be made within the scope of the aforesaid description. Such modifications being within the ability of one skilled in the art form a part of the present invention and are embraced by the appended claims.

It is claimed:

1. Process for producing low organic solvent containing binders for stoving coating compositions, water-dilutable upon partial or total salt formation with ammonia or amines, based on a combination of a film-forming water-dilutable polycarboxy compound and a film-forming water-soluble polyhydroxy compound, comprising the steps of condensing (A) 10 to 90% by weight of a water-dilutable polycarboxy compound selected from the group consisting of (Aa) at least one addition product of maleic acid anhydride with unsaturated oils or fatty acids, the anhydride groups of which are opened with water or a monoalcohol and which has an acid value of between 50 and 400 mg KOH/g and an intrinsic viscosity of from 4.5 to 8.0 ml/g measured in N,N-dimethylformamide at 20° C., and (Ab) at least one copolymer having an acid value of between 100 and 200 mg KOH/g, and an intrinsic viscosity of between 4.5 and 8 ml/g measured in N,N-dimethylformamide at 20° C., at from about 80 to 140° C. to an intrinsic viscosity of from 14 to 19 ml/g measured in N,N-dimethylformamide at 20° C. with (B) 90 to 10% by weight of a water-insoluble polyhydroxy compound which is an epoxy resin amine adduct which is substantially insoluble in water under processing conditions, having a hydroxyl value of between about 50 and 300 mg KOH/g and an intrinsic viscosity of from about 9 to 12 ml/g measured in N,N-dimethylformamide at 20° C.

2. The process according to claim 1 wherein component (A) is present at from 20 to 50% by weight, and component (B) is present at from 50 to 80% by weight with an intrinsic viscosity of from between about 10 and 11 ml/g measured in N,N-dimethylformamide at 20° C.

3. The process according to claim 1 wherein the epoxy resin amine adduct, component (B), is the reaction product of diepoxy resins of bisphenol A/epichlorohydrin with a secondary amine.

4. The process according to claim 3 wherein said secondary amine is a dialkanolamine.

5. The process according to claim 1 wherein components (A) and (B) are selected in order that the quotient (IV(B)/IV(A)) lies between 1.4 and 2.7, wherein the terms IV(A) and IV(B) are the values for the intrinsic viscosities of the components (A) and (B), measured in N,N-dimethylformamide at 20° C. and expressed in ml/g.

6. A paint utilizing the binders produced according to the process of claim 1.

* * * * *